US008490469B2

(12) United States Patent
Superfine et al.

(10) Patent No.: US 8,490,469 B2
(45) Date of Patent: Jul. 23, 2013

(54) METHODS AND SYSTEMS FOR MULTIFORCE HIGH THROUGHPUT SCREENING

(75) Inventors: Richard Superfine, Chapel Hill, NC (US); Leandra Vicci, Siler City, NC (US)

(73) Assignee: The University of North Carolina, Chapel Hill, NC (US)

( * ) Notice: Subject to any disclaimer, the term of this patent is extended or adjusted under 35 U.S.C. 154(b) by 712 days.

(21) Appl. No.: 12/528,312

(22) PCT Filed: Feb. 22, 2008

(86) PCT No.: PCT/US2008/002331
§ 371 (c)(1), (2), (4) Date: Jan. 7, 2010

(87) PCT Pub. No.: WO2008/103430
PCT Pub. Date: Aug. 28, 2008

(65) Prior Publication Data

US 2010/0101308 A1 Apr. 29, 2010

Related U.S. Application Data

(60) Provisional application No. 60/902,664, filed on Feb. 22, 2007.

(51) Int. Cl.
*G01N 11/00* (2006.01)

(52) U.S. Cl.
USPC .......... 73/54.01

(58) Field of Classification Search
USPC .......... 73/54.01
See application file for complete search history.

(56) References Cited

U.S. PATENT DOCUMENTS 4,408,277 A 10/1983 Cortellini et al.
4,462,096 A 7/1984 Kusaka (Continued)

FOREIGN PATENT DOCUMENTS

WO WO 03/029921 4/2003
WO WO 2006/020187 2/2006
WO WO 2008/139401 A2 11/2008
WO WO 2010/151780 A2 12/2010

OTHER PUBLICATIONS

International Search Report for International Application No. PCT/GB2008/000489 (Jun. 25, 2008).
Interview Summary for U.S. Appl. No. 11/632,151 (Mar. 29, 2011).

(Continued)

*Primary Examiner* — Peter Macchiarolo
*Assistant Examiner* — Alex Devito
(74) *Attorney, Agent, or Firm* — Jenkins, Wilson, Taylor & Hunt, P.A.

(57) ABSTRACT

Methods and systems for multiforce high throughput screening are disclosed. According to one aspect, the subject matter includes a high throughput screening system that includes a multiforce plate having a plurality of field forming poles where each field forming pole is positioned on the multiforce plate at a location corresponding to a well in a multiwell plate. The system also includes an exciter assembly with excitation poles positioned at locations corresponding to the field forming poles. The excitation poles are utilized for electrically or magnetically coupling to the field forming poles and for delivering at least one of an electric and magnetic field in the vicinity of the field forming poles. The coupled field forming poles apply force via the field(s) to probes located in the wells of the multiforce plate in order to move the probes and test mechanical properties of specimens in the wells.

36 Claims, 13 Drawing Sheets

U.S. PATENT DOCUMENTS

| | | | |
|---|---|---|---|
| 5,110,727 | A | 5/1992 | Oberhardt |
| 5,206,504 | A | 4/1993 | Sridharan |
| 5,350,676 | A | 9/1994 | Oberhardt et al. |
| 5,410,370 | A | 4/1995 | Janssen |
| 5,436,448 | A | 7/1995 | Hosaka et al. |
| 5,458,785 | A | 10/1995 | Howe et al. |
| 5,467,146 | A | 11/1995 | Huang et al. |
| 5,483,058 | A | 1/1996 | Leviton |
| 5,528,318 | A | 6/1996 | Janssen |
| 5,548,058 | A | 8/1996 | Muroi et al. |
| 5,638,303 | A | 6/1997 | Edberg et al. |
| 5,668,611 | A | 9/1997 | Ernstoff et al. |
| 5,698,843 | A | 12/1997 | Phak |
| 5,903,323 | A | 5/1999 | Ernstoff et al. |
| 5,976,369 | A | 11/1999 | Howe et al. |
| 6,018,402 | A | 1/2000 | Campbell et al. |
| 6,067,207 | A | 5/2000 | Kurita |
| 6,162,364 | A | 12/2000 | Tillotson et al. |
| 6,166,706 | A | 12/2000 | Gallagher et al. |
| 6,219,110 | B1 | 4/2001 | Ishikawa et al. |
| 6,269,324 | B1 | 7/2001 | Rakijas et al. |
| 6,330,824 | B1 | 12/2001 | Eric et al. |
| 6,370,107 | B1 | 4/2002 | Hosaka et al. |
| 6,412,429 | B2 | 7/2002 | Foresman |
| 6,412,972 | B1 | 7/2002 | Pujol et al. |
| 6,428,169 | B1 | 8/2002 | Deter et al. |
| 6,442,416 | B1 | 8/2002 | Schultz |
| 6,456,339 | B1 | 9/2002 | Surati et al. |
| 6,457,833 | B1 | 10/2002 | Ishikawa et al. |
| 6,470,226 | B1 | 10/2002 | Olesen et al. |
| 6,493,149 | B2 | 12/2002 | Ouchi |
| 6,496,332 | B1 | 12/2002 | Okazaki et al. |
| 6,503,195 | B1 | 1/2003 | Keller et al. |
| 6,545,580 | B2 | 4/2003 | Hegde et al. |
| 6,549,004 | B1 | 4/2003 | Prigge |
| 6,588,944 | B2 | 7/2003 | Harris |
| 6,596,076 | B1 | 7/2003 | Wakayama |
| 6,609,798 | B1 | 8/2003 | Milinusic et al. |
| 6,624,919 | B2 | 9/2003 | Lambert |
| 6,636,275 | B1 | 10/2003 | Wilson |
| 6,650,213 | B1 | 11/2003 | Sakurai et al. |
| 6,716,642 | B1 | 4/2004 | Wu et al. |
| 6,769,792 | B1 | 8/2004 | Bornhorst |
| 6,794,197 | B1 | 9/2004 | Indermuhle et al. |
| 6,881,954 | B1 | 4/2005 | Mormoto et al. |
| 6,885,266 | B2 | 4/2005 | Ochi-Okorie |
| 6,960,984 | B1 | 11/2005 | Vicci et al. |
| 7,119,645 | B2 | 10/2006 | Vicci et al. |
| 7,189,969 | B2 | 3/2007 | Vicci et al. |
| 7,191,092 | B2 | 3/2007 | Vicci et al. |
| 7,305,319 | B2 | 12/2007 | Vicci et al. |
| 8,152,305 | B2 | 4/2012 | Keller et al. |
| 2001/0055462 | A1 | 12/2001 | Seibel |
| 2002/0008812 | A1 | 1/2002 | Conner et al. |
| 2002/0171809 | A1 | 11/2002 | Kurtz et al. |
| 2002/0176149 | A1 | 11/2002 | Davis et al. |
| 2003/0004985 | A1 | 1/2003 | Kagimasa et al. |
| 2003/0013079 | A1 | 1/2003 | Petropoulos |
| 2003/0024911 | A1 | 2/2003 | Horsting et al. |
| 2003/0118222 | A1 | 6/2003 | Foran et al. |
| 2003/0227465 | A1 | 12/2003 | Morgan et al. |
| 2004/0140981 | A1 | 7/2004 | Clark |
| 2004/0141213 | A1 | 7/2004 | Kleiman |
| 2004/0191915 | A1 | 9/2004 | Bawendi et al. |
| 2004/0241759 | A1 | 12/2004 | Tozer et al. |
| 2004/0244470 | A1 | 12/2004 | Vicci et al. |
| 2004/0262210 | A1 | 12/2004 | Westervelt et al. |
| 2005/0015001 | A1 | 1/2005 | Lec et al. |
| 2005/0064395 | A1 | 3/2005 | Israel et al. |
| 2005/0231651 | A1 | 10/2005 | Myers et al. |
| 2005/0276727 | A1 | 12/2005 | Pawliszyn et al. |
| 2006/0068107 | A1 | 3/2006 | Madou et al. |
| 2006/0229842 | A1 | 10/2006 | Vicci et al. |
| 2007/0031819 | A1 | 2/2007 | Koschwanez et al. |
| 2008/0261261 | A1 | 10/2008 | Grimes et al. |
| 2009/0009723 | A1 | 1/2009 | Keller et al. |
| 2012/0156791 | A1 | 6/2012 | Superfine et al. |

OTHER PUBLICATIONS

Official Action for U.S. Appl. No. 11/632,151 (Feb. 9, 2011).
Belmiloud et al., "Rheological Behavior Probed by Vibrating Microcantilevers," Applied Physics Letters, vol. 92 (Jan. 30, 2008).
Sniadecki et al., "Magnetic Microposts as an Approach to Apply Forces to Living Cells," Proceedings of Natual Academy of Sciences, vol. 104, No. 37 (Sep. 11, 2007).
Notice of Allowance and Fee(s) Due for U.S. Appl. No. 10/487,860 (Jul. 25, 2007).
Evans et al., "Magnetically Actuated Nanorod Arrays as Biomin\metic Cilia," American Chemical Society, vol. 7, No. 5, pp. 1428-1434 (Apr. 10, 2007).
Official Action for U.S. Appl. No. 10/487,860 (Feb. 28, 2007).
Supplemental Notice of Allowability for U.S. Appl. No. 11/440,912 (Feb. 7, 2007).
Supplemental Notice of Allowability for U.S. Appl. No. 11/440,881 (Feb. 7, 2007).
Interview Summary for U.S. Appl. No. 10/487,860 (Jan. 22, 2007).
Notification of Transmittal of the International Search Report and the Written Opinion of the International Searching Authority, or the Declaration for International Application No. PCT/US05/25380 (Oct. 26, 2006).
Supplemental Notice of Allowability for U.S. Appl. No. 10/786,427 (Aug. 17, 2006).
Notice of Allowance and Fee(s) Due for U.S. Appl. No. 11/440,912 (Jul. 25, 2006).
Notice of Allowance and Fee(s) Due for U.S. Appl. No. 11/440,881 (Jul. 25, 2006).
Final Official Action for U.S. Appl. No. 10/487,860 (Jul. 19, 2006).
Notice of Allowance and Fee(s) Due for U.S. Appl. No. 10/786,427 (Mar. 28, 2006).
3rdTech, "HiBall™-3100 Wide-Area Tracker and 3D Digitizer," 3rd Tech, Inc. (2006).
Office Action in U.S. Appl. No. 10/487,860 (Dec. 7, 2005).
Restriction Requirement for U.S. Appl. No. 10/786,427 (Oct. 4, 2005).
Notification of Transmittal of International Preliminary Examination Report for International Application No. PCT/US02/30853 (Mar. 4, 2004).
Notification of Transmittal of the International Search Report or the Declaration for International Application No. PCT/US02/30853 (May 7, 2003).
Prisco et al., "Point-of-Care Testing of Hemostasis in Cardiac Surgery," Thrombosis Journal, vol. 1, No. 1, 10 pgs. (May 2003).
Jian Ling, "Toward Raman Spectroscopy of Biological Tissue for Cancer Diagnosis", Southwest Research Institute IR&D, 10-9359 (Feb. 2003).
Roth et al., "Wide Gamut, High Brightness Multiple Primaries Single Panel Projection Displays," SID Digest, ISSN/0003-0966X/03/3403-0694 (Copyright 2003).
Wilde, "Three-Dimensional Force Microscope," (Downloaded from the Internet on Jun. 24, 2002).
"MFP-3D™ Atomic Force Microscope Power and Flexibility in One Complete System" Asylum Research, pp. 1-4 (Jun. 5, 2002).
Lee et al., "Microelectromagnets for the Control of Magnetic Nanoparticles," Applied Physics Letters, vol. 79, No. 20, pp. 3308-3310 (Nov. 12, 2001).
Vicci, "A 3D Magnetic Force Manipulator DC Prototype," Department of Computer Science, UNC Chapel Hill (Oct. 17, 2001).
Requicha et al., "Manipulation of Nanoscale Components with the AFM: Principles and Applications," Proceedings of the 2001 1st IEEE Conference on Nanotechnology, pp. 81-86 (Oct. 2001).
Baldis. "Institute for Laser Science and Applications," U.S. Department of Energy, UCRL-ID-145269 (Aug. 27, 2001).
Vicci, "A 3D Magnetic Force Manipulator DC Prototype," Department of Computer Science, UNC Chapel Hill (Jul. 3, 2001).
Heaton et al., "Scanning Probe/Atomic Force Microscopy: Technology Overview and Update," pp. 1-8 (Mar. 2001).
Welch et al., "High-Performance Wide-Area Optical Tracking—The HiBall Tracking System," Presence, vol. 10, No. 1, Massachusetts Institute of Technology (Feb. 2001).

Choi et al., "An On-Chip Magnetic Bead Separator Using Spiral Electromagnets with Semi-Encapsulated Permalloy," Biosensors & Bioelectronics 16, pp. 409-416 (2001).
"Atomic Force Microscopy," Veeco Metrology Group (Downloaded from the Internet on Jun. 24, 2002) (Copyright 2001).
Keller et al., "Real-time Structured Light Depth Extraction," Three Dimensional Image Capture and Applications III; SPIE Proceedings, p. 11-18; Photonics West—Electronic Imaging 2000 (Jan. 2000).
Choi et al., "A New Magnetic Bead-Based, Filterless Bio-Separator with Planar Electromagnet Surfaces for Integrated Bio-Detection Systems," Sensors and Actuators B 68, pp. 34-39 (2000).
Stavros Demos, "Endoscopic Subsurface Optical Imaging for Cancer Detection," Institute for Laser Science and Applications Report 2000.
Welch et al., "The HiBall Tracker: High-Performance Wide-Area Tracking for Virtual and Augmented Environments," Symposium on Virtual Reality Software and Technology, University College London (Dec. 20-22, 1999).
Ajito et al., "Six-Primary Color Projection Display for Expanded Color Gamut Reproduction," International Symposium on Multispectral Imaging and Color Reproduction for Digital Archives, Chiba, Japan, pp. 135-138 (1999).
Ahn et al., "Micromachined Planar Inductors on Silicon Wafers for MEMS Applications," IEEE Transactions on Industrial Electronics, vol. 45, No. 6, pp. 866-876 (Dec. 1998).
Drndić et al., "Micro-Electromagnets for Atom Manipulation," Applied Physics Letters, vol. 72, No. 22, pp. 2906-2908 (Jun. 1, 1998).
Ahn et al., "A Fully Integrated Micromachined Magnetic Particle Separator," Journal of Microelectromechanical Systems, vol. 5, No. 3, pp. 151-158 (Sep. 1996).
Hosaka et al., "Damping Characteristics of Beam-Shaped Micro-Oscillators," Elsevier Science Sensors and Actuators, vol. 49, pp. 87-95 (Feb. 1995).
Ahn et al., "A Fully Integrated Planar Toroidal Inductor with a Micromachined Nickel-Iron Magnetic Bar," IEEE Transactions on Components, Packaging, and Manufacturing Technology—Part A, vol. 17, No. 3, pp. 463-469 (Sep. 1994).
"The First Commercial Low Temperature Near-field Optical Microscope," NSOM/AFM 100 Confocal LT™, pp. 1-2 (Publication Data Unknown).
Communication of European publication number and information on the application of Article 67(3) EPC for European Application No. 10792732.9 (Apr. 4, 2012).
Final Official Action for U.S. Appl. No. 11/632,151 (Jul. 28, 2011).
Notification of Transmittal of the International Search Report and the Written Opinion of the International Searching Authority, or the Declaration for International Application No. PCT/US2010/040011 (Feb. 15, 2011).

METHODS AND SYSTEMS FOR MULTIFORCE HIGH THROUGHPUT SCREENING

PRIORITY CLAIM

This application claims the benefit of U.S. Provisional Patent Application Ser. No. 60/902,664, filed Feb. 22, 2007, the disclosure of which is incorporated herein by reference in its entirety.

GOVERNMENT INTEREST

This invention was made with government support under Grant Nos. 5 P41EB002025 and 1 R01 EB000761-01 awarded by the National Institutes of Health. The government has certain rights in the invention.

TECHNICAL FIELD

The subject matter described herein relates to the application of magnetic and/or electrical forces to various specimens and/or to mechanically unattached probes located in the specimens for high throughput screening of at least one of mechanical, chemical, or biological properties of the specimens.

BACKGROUND

Currently, there is a significant need for force measurements in biological and biomedical sciences. Namely, biological systems respond to forces and stresses such that the responses (both physical and biochemical) can be used to determine the health of a patient. For example, blood clots serve to stem the flow of blood in a wound, and the clotting success relies on the mechanical integrity of protein filaments called fibrin fibers. Similarly, the tissues that line the blood vessels and the lung also respond to stress. These cells are under constant cyclic stress due to the pumping of blood and due to respiration, respectively. In the case of the endothelial cells that line blood vessels, the response of these cell linings determine the release of biochemical agents to retard inflammation. In the case of the epithelial cells that line the lung, the stress response regulates the amount of mucus that coats the lung. With the vast set of biochemical pathways that need to be elucidated and complex mechanisms that need to be explored, the biological sciences have developed high throughput screening where hundreds to millions of experiments can be performed in parallel. However, at this time, there is no equivalent high throughput assay that applies force and measures the biological response to the stress.

Other types of high throughput experiments that can be conducted include magnetic experiments where molecules are separated based on permeability, electrochemical experiments where conductivity of an assay is measured by applying a potential difference and measuring the corresponding current, electrophoresis where molecules in an assay are differentiated based on charge, dielectrophoresis where molecules in an assay are differentiated based on polarizability, frequency dependent electric or magnetic experiments where molecules are differentiated based on frequency response under an applied time varying electric or magnetic field, and combinations of any of these types of experiments.

Accordingly, there exists a need for methods and systems for multiforce high throughput screening methods.

SUMMARY

Methods and systems for multiforce high throughput screening are disclosed. According to one aspect, the subject matter disclosed herein includes a multiforce high throughput screening system that includes an exciter assembly having a plurality of excitation poles where each excitation pole is positioned on the exciter assembly at a location corresponding to a well in a multiwell plate. The system also includes a force delivery pole plate with field forming poles positioned at locations corresponding to the excitation poles. The field forming poles are utilized for electrically or magnetically coupling to the excitation poles and for forming at least one of an electric and magnetic field in the vicinity of the specimens. A multiforce plate comprises a conventional multiwell plate and the pole plate. The fields formed by the coupled field forming poles apply force(s) on probes located in the specimen wells of the multiforce plate in order to move the probes and test mechanical properties of specimens in the wells.

BRIEF DESCRIPTION OF THE DRAWINGS

The subject matter described herein will now be explained with reference to the accompanying drawings of which.

DETAILED DESCRIPTION

Figure 1:
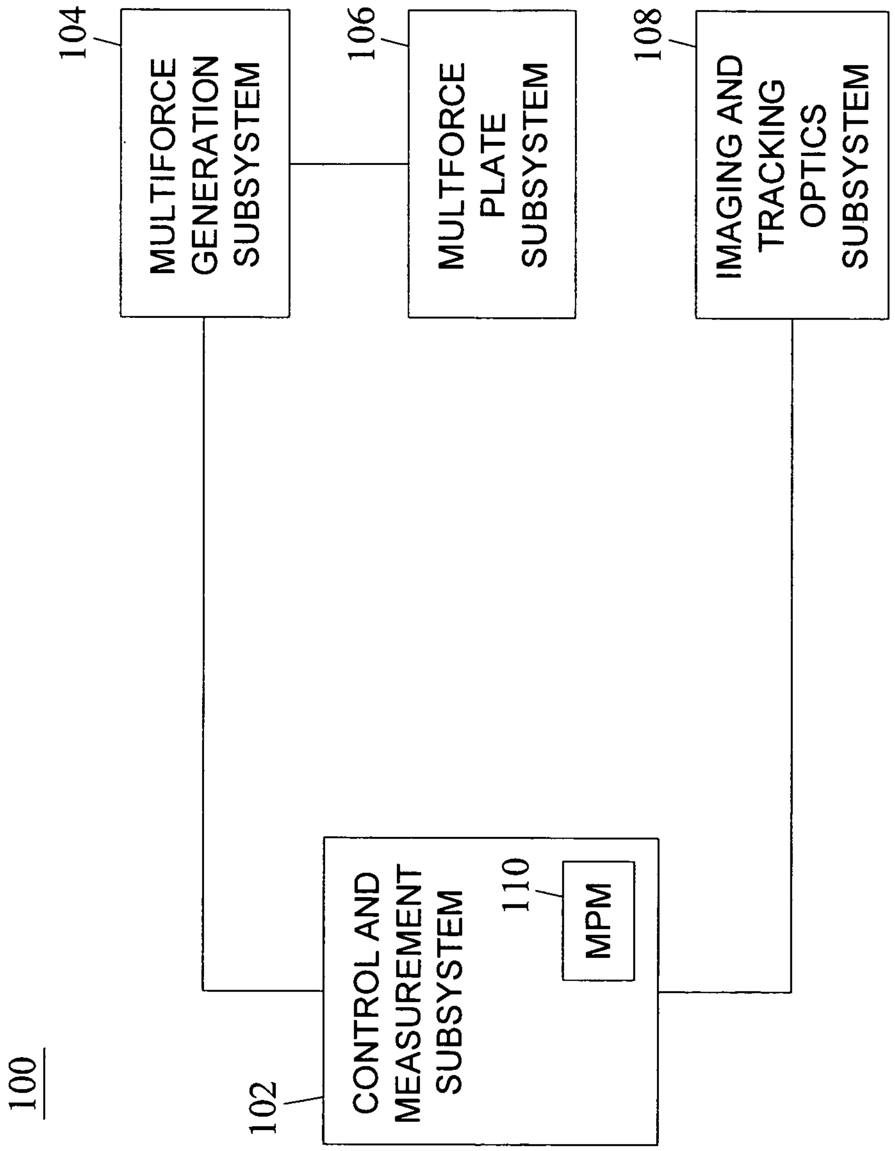
FIG. 1 is a block diagram of an exemplary multiforce high throughput screening system according to an embodiment of the subject matter described herein.

The subject matter disclosed herein is directed to a multiforce high throughput screening system which can be used to apply electric and/or magnetic fields to mechanically unattached probes located in specimens in a multiwell plate or directly to the specimens themselves. Mechanically unattached probes disposed in the specimen wells may move under the applied electric or magnetic field. Imaging and tracking optics may track the movement of the probes under the applied fields. As a result of the applied fields and the tracked probe movements, mechanical properties of each specimen, such as viscosity can be tested. In applications where electric and/or magnetic fields are applied directly to the specimens, diamagnetic, paramagnetic, dielectrophoretic, electrophoretic, and electrochemical properties of the specimens can be tested. Because the subject matter described herein provides a convenient structure for simultaneously applying electric and/or magnetic fields to plural specimens, multiforce high-throughput screening can be achieved.

As mentioned above, one technique for applying force to a specimen via the system is through magnetic fields. A magnetic probe (e.g., a mechanically unattached bead or rod) may experience a force or torques from magnetic fields and field gradients. Notably, the magnetic force can act on a probe that is placed in a specimen of interest. The specimen may be biological (e.g., a molecule, a cell, a tissue culture, etc.) or of material science interest. The probe may be characterized as one of several magnetic properties (paramagnetic, ferromagnetic, diamagnetic, etc.) and be of arbitrary shape (bead, rod, etc.). The specimen may also be in suspension in a fluid or gel, inside a cell, on top of a cell or cell culture, or anywhere in contact with a biological specimen, such as a tissue specimen or culture. When the magnetic force is applied to the probe, the probe moves in a way that is characteristic of the applied magnetic force and the forces that are imposed by the biological specimen.

There are several approaches to measuring the response of the above-mentioned applied force. For example, the motion of a probe that is influenced by magnetic field may be measured. The response of the probe can then be used as a measure of the specimen's mechanical properties, such as inherent linear and non-linear viscoelastic properties. This particular method of measurement may be useful in biomedical applications such as ascertaining fibrin fiber gel formation and dissolution, as well as determining mucus rheological properties of a specimen. In cases where the probe is attached to a cell, the mechanical properties of the cell may be quantified. Different cell types may exhibit different ranges of stiffness.

A second approach to measuring the response of the applied force may include measuring the motion of the specimen away from the magnetic probe. This measurement approach may be used to identify how stress is conveyed through a molecule, cell, or tissue. The measurement approach may also elucidate pathways in the biochemical response of a biological system.

Yet another approach to measuring the response of the applied force may include monitoring the specimen itself. Namely, the specimen may respond to the applied force by releasing biochemicals, restructuring itself, regulating activity, and the like. These responses can be measured using some other measurement technique, such as using fluorescence microscopy to measure the various degrees of biochemical release.

FIG. 1 depicts a block diagram of an exemplary multiforce high throughput screening system 100 that is capable of applying a force and measuring the specimen responses. Generally speaking, system 100 includes a control and measurement subsystem 102, a multiforce generation subsystem 104, a multiwell plate 106, and an imaging and tracking optical subsystem 108.

Figure 2B:
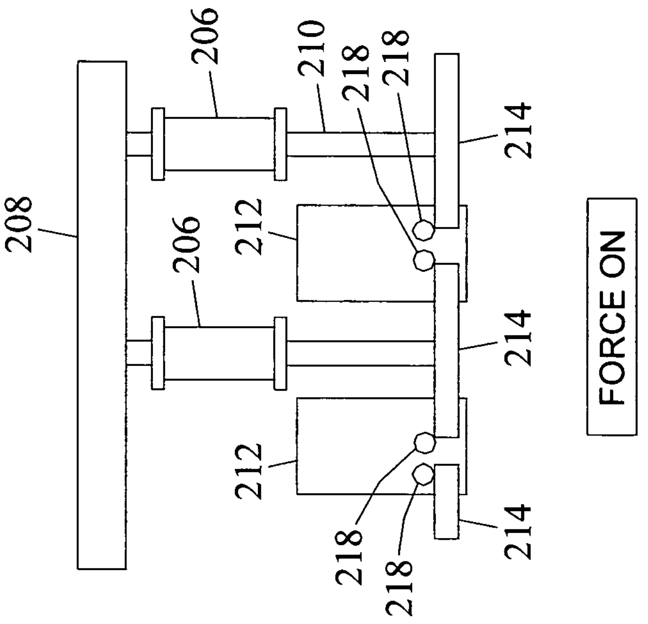
FIG. 2 is a diagram of two configurations of an exemplary multiforce high throughput system according to an embodiment of the subject matter described herein.
Figure 2A:
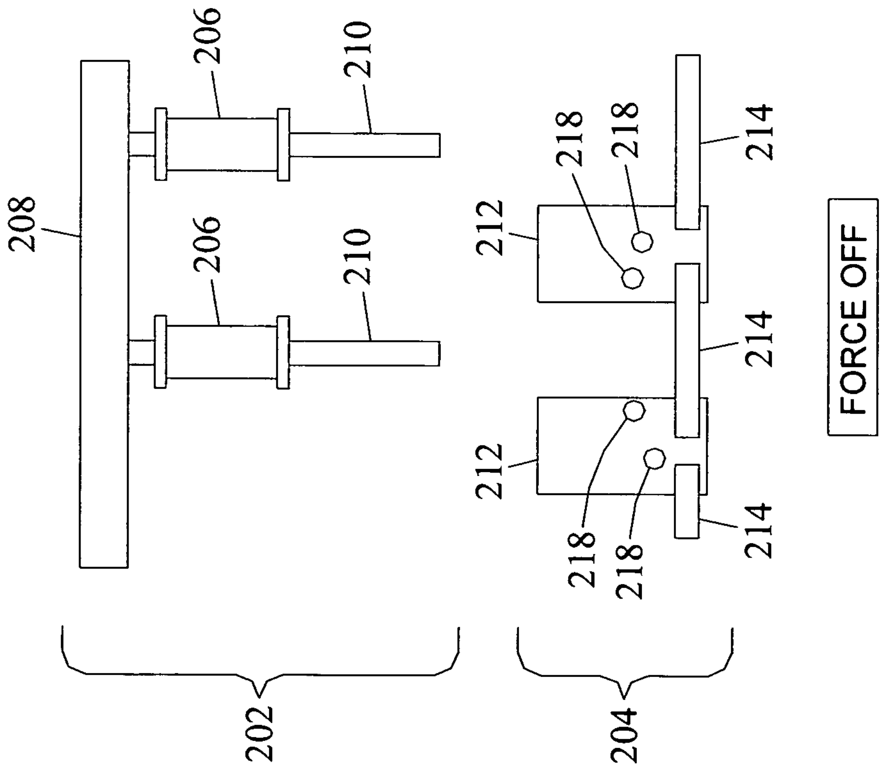

In one embodiment, multiforce generation subsystem 104 comprises a magnetic drive block, such as exciter assembly 202, which is shown in FIG. 2A. Referring to FIG. 2A, exciter assembly 202 may include a plurality of excitation poles 210, each of which may include a coil 206. Coils 206, which generate the magnetic field, may include standard wire-wrapped bobbins or, alternatively, the coils may be patterned on a multilayer printed circuit board. The latter embodiment is especially well suited for tight spatial constraints that may be imposed by high numerical aperture microscopy or smaller well layouts. Excitation poles 210 may be attached to a magnetic flux return plate 208. In one embodiment, excitation poles 210 and flux return plate 208 may be made from a high permeability material, such as soft iron. Subsystem 104 may also include an appropriate cooling mechanism (not shown) to dissipate excess heat or to maintain system 100 at a target temperature. In one embodiment, subsystem 104 is capable of producing forces of significant magnitude (e.g., forces greater than 10 nanoNewtons), in multiple directions over a three dimensional sphere, and can be varied at frequencies up to more than three kilohertz.

Returning to FIG. 1, system 100 also includes a multiforce plate subsystem 106. Multiforce plate subsystem 106 may comprise a microtiter well plate that includes a plurality of specimen wells. The well plate may also be coupled with a cover glass sheet that serves as the bottom of the well plate. Multiforce plate subsystem 106 may also include a plurality of field forming poles that are used to form a magnetic (or electric) coupling with excitation poles of multiforce generation subsystem 104. This is better illustrated in FIG. 2A where multiforce plate subsystem 106 is represented as multiforce plate 204. In one embodiment, (not shown in FIG. 2A), the field forming poles may be integrated into a cover glass sheet.

Referring to FIG. 2A, multiforce plate 204 includes a plurality of specimen wells 212 that are adjacent to field forming poles 214 (i.e., field forming poles). Specimen wells 212 may include specimen chambers of a microtiter well plate. In one embodiment, field forming poles 214 may be fabricated from thin sheets of magnetic material (e.g., laser cutting from sheet magnetic material or by electrodeposition using a photolithography mask) and are responsible for carrying the flux delivered by excitation poles 210 to the specimen.

Notably, field forming poles 214 may be positioned in proximity to or may be located inside of wells 212. Each well 212 may contain one or more probes 218. In one embodiment, probes 218 may include mechanically unattached beads or rods that may be magnetized. In a magnetic application, probes can be formed of a paramagnetic or a diamagnetic material. In an electrical application, probes 218 can be charged or chargeable particles. As shown in FIGS. 2A and 2B, probes 218 may be suspended in the specimens contained in wells 212. In one embodiment, probes 218 may be floating in a specimen because the specimens have not yet been affected by an applied magnetic field. Notably, FIG. 2A shows that the force is not activated since excitation poles 210 have not been brought into proximity or contact with field forming poles 214 of multiforce plate 204, (and coils 206 have not been energized).

In contrast, the activation of force is shown in FIG. 2B, which depicts magnetized probes 218 attracted to field forming poles 214. Notably, FIG. 2B illustrates exciter assembly 202 being brought into magnetic contact with field forming poles 214 which are integrated with specimen wells 212 of multiforce plate 204. In order to generate the magnetic force, excitation poles 210 need to be coupled to field forming poles 214 and coils 206 need to be energized. More specifically, magnetic flux is generated by the set of coils 206 that is magnetically coupled to a flux return path to minimize the magnetic circuit reluctance. For example, excitation poles 210 carry the flux from coils 206 to field forming poles 214 and then back to magnetic flux return plate 208 (via flux return posts that are described below). In this way, a magnetic circuit is created that affords relatively low circuit reluctance and generates significant magnetic fields and forces at field forming poles 214. In this configuration, each field forming pole 214 in the multiforce plate 204 is driven by an excitation pole 210.

In an alternative embodiment, magnetic flux return plate 208 may be replaced by a local return path that serves each coil 206. This may include a cylindrical cap over each coil 206, with flux routed from one end of coil 206 through a field forming pole 214 and back through the outer cylinder to the other end of the coil 206. This implementation may be useful for isolating each well 212 from all of the other wells and by allowing maximum flexibility in the experimental methodology.

Although system 200 was initially designed to be utilized with a standard 96 well plate geometry (e.g., a conventional microtiter plate), system 200 may easily be adapted to accommodate a smaller or larger number of wells.

In one embodiment, control and measurement subsystem 102 may be designed to be computer controlled and is able to generate flux from each of coils 206. The control of the magnetic flux at each coil 206 is achieved by coordinating the currents in the coils so that the coils generate flux either in a limited set of nearby specimen wells 212, or generate fields and forces in every well on multiforce plate 204. Equations to determine which coils to activate for a given configuration of activated specimen wells may be solved by standard linear equations of circuit theory, with known correspondences between magnetic circuit and electrical circuit quantities.

Figure 3A:
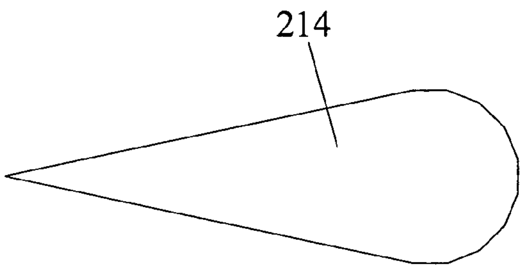
FIGS. 3A and 3B are diagrams of exemplary field forming poles according to an embodiment of the subject matter described herein.
Figure 3B:
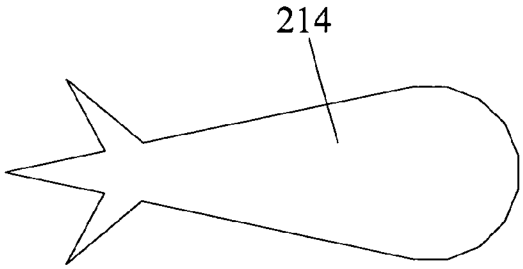

In one embodiment, each field forming pole 214 comprises an elongate member having a teardrop-like shape with a single pole tip. Such an embodiment is illustrated in FIG. 3A. Such an embodiment is useful for applying forces towards the field forming pole. In an alternate embodiment, each field forming pole 214 may have a plurality of pole tips for applying forces from a plurality of different points increasing the usable area of each specimen well. This embodiment is illustrated in FIG. 3B.

Control and measurement subsystem 102 may also include a mechanical properties module 110 that is used to measure the mechanical properties of the specimen depending on the measured movement of the probe. An imaging and tracking optical system 108 may also be employed to perform several kinds of measurements, either simultaneously with the application of force or after the force sequence has been applied. For example, optical system 108 may include a single specimen imaging system with a robotic stage that can systematically position each well 212 over a microscope objective. Alternatively, optical system 108 may include an array based system that is capable of imaging several wells simultaneously. The recorded images may be used to track the probe position, to image strains in the specimen, to detect biochemical activity in the specimen through fluorescence signals, and the like. In one embodiment, optical system 108 may include the placement of a lens in an illumination aperture of exciter assembly 202. Notably, the lens may be embodied as a cylindrical lens that is characterized by a certain gradient index of refraction. The index of refraction that is selected is one that enables the lens to focus a light beam on the specimen as it traverses the narrow length of the illumination aperture. For example, an illumination source, which is placed above the illumination aperture in exciter assembly 202, may be used to project light into the gradient index of refraction lens. The focused light is then directed to the specimen in the specimen well (and a collector and/or microscope objective located on the underside of the specimen well).

In one embodiment, the typical operation of system 200, involves the multiforce plate 204 being loaded with specimens, processed, and then engaged with exciter assembly 202. Together, the combined system may be placed above an inverted microscope objective to measure probe motion (e.g., bead motion) during the application of force via a magnetic field. In cases where the force is to be applied without direct observation, exciter assembly 202 may be energized through some designed sequence in the absence of observation, with the effects of the magnetic forces and fields measured at a later time.

Figure 4:
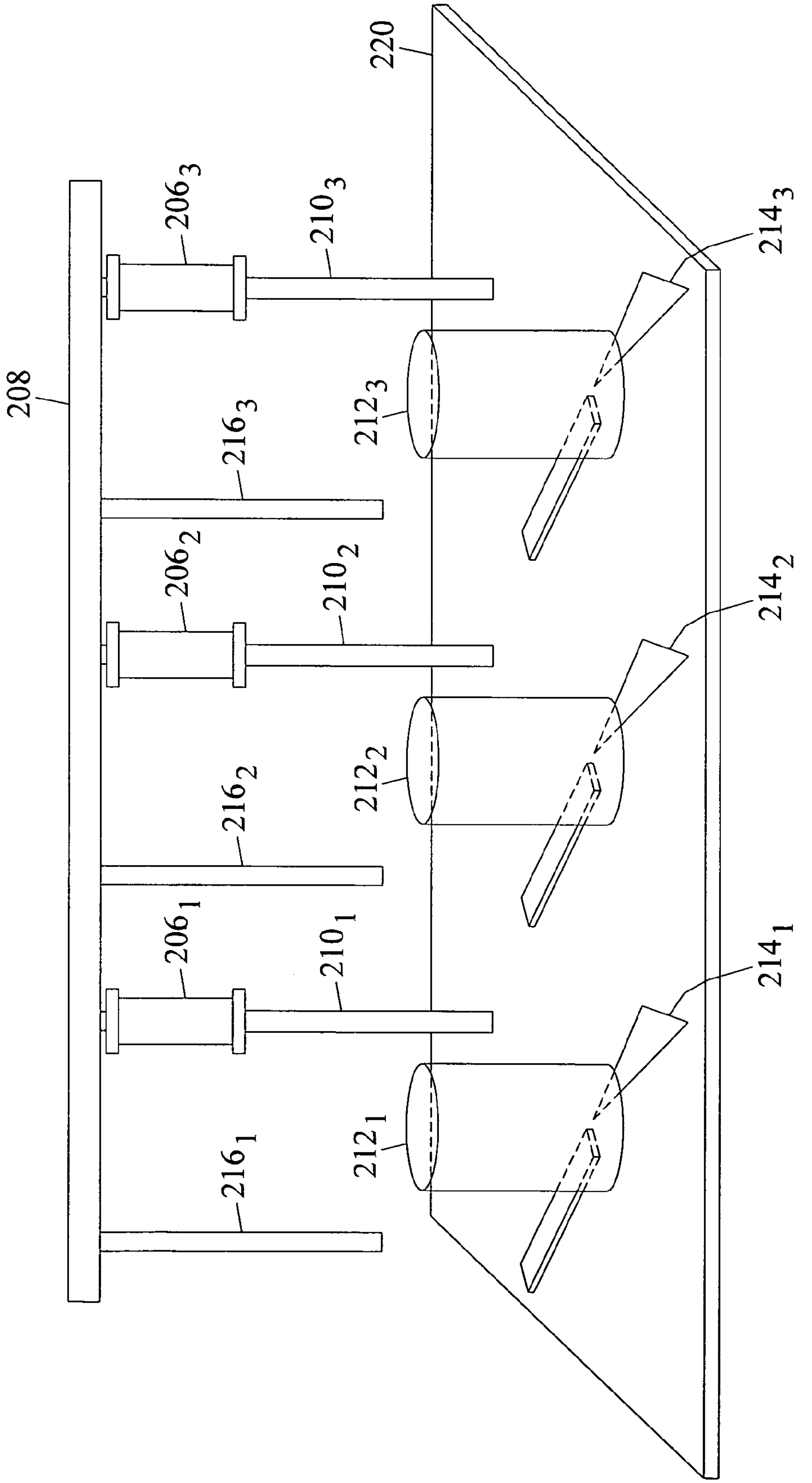
FIG. 4 is diagram depicting exemplary separation of the exciter assembly from the multiforce plate of a multiforce high throughput system according to an embodiment of the subject matter described herein.
Figure 5:
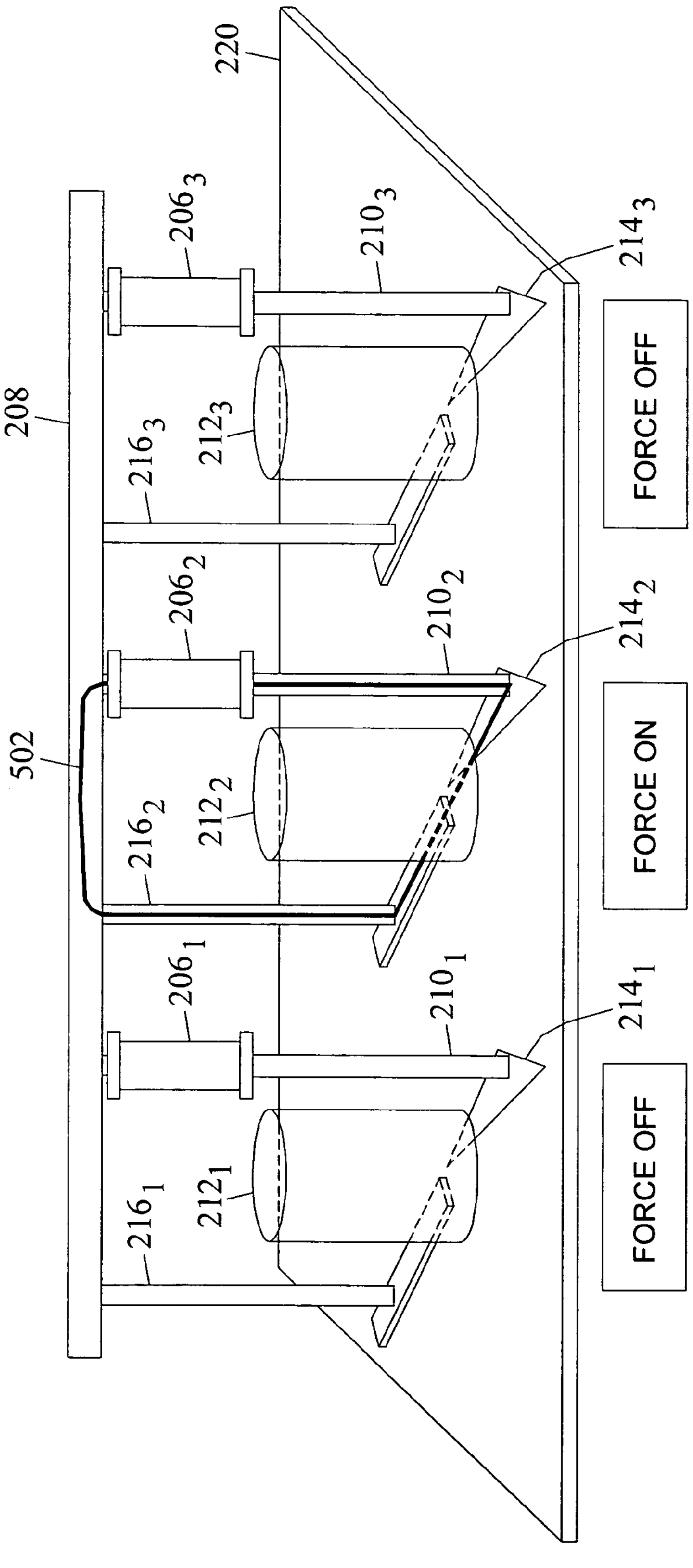
FIG. 5 is a diagram illustrating selectively exciting a single well of a multiforce plate according to an embodiment of the subject matter described herein.

In addition to applying a magnetic field to a plurality of specimen wells, the present subject matter is also capable of selectively powering a single designated well in a multiforce plate according to one embodiment of the subject matter described herein. In FIG. 4, flux return plate 208 represents a sheet of high permeability magnetic material that serves as a path for the return of magnetic flux. The cylinders represent coils 206 that are responsible for generating the flux to be delivered via excitation poles 210. Cover glass plate 220 represents the bottom of a multiwell plate (e.g., a microtiter plate) which is depicted as a plurality of specimen wells 212. In one embodiment, cover glass plate 220 is integrated with thin foil field forming poles 214 to form a pole plate. The magnetic drive block or exciter assembly 202, has a single magnetic flux return plate 208 that is coupled to excitation poles 210 that may be positioned to contact this layer of field forming poles 214. In addition to excitation poles 210 that generate flux (via coils 206), exciter assembly 202 may include flux return posts 216 which are not equipped with coils. Flux return posts 216 are adapted to complete the magnetic circuit by providing a return path to flux return plate 208. By providing a return path for the flux for each separate well, control over individual wells may be achieved. For example, the fields and forces applied to a given specimen well are primarily generated by the current in the coil feeding that particular specimen well. This is shown in FIG. 5 where excitation poles 210 and flux return posts 216 are brought into contact with field forming poles 214. Specifically, because excitation pole $\mathbf{210}_2$ is brought into contact with field forming pole $\mathbf{214}_2$ and coil $\mathbf{206}_2$ is activated, only magnetic flux 502 is generated. Flux 502 is shown as a line that circles through the current coil $\mathbf{206}_2$, to field forming pole $\mathbf{214}_2$, across the gap in specimen well $\mathbf{212}_2$, back up through flux return post $\mathbf{216}_2$, and then through magnetic flux return plate 208 to complete the magnetic circuit. Notably, flux is not present in specimen wells $\mathbf{212}_1$ and $\mathbf{212}_3$ because coils $\mathbf{206}_1$ and $\mathbf{206}_3$ are not activated.

Figure 6B:
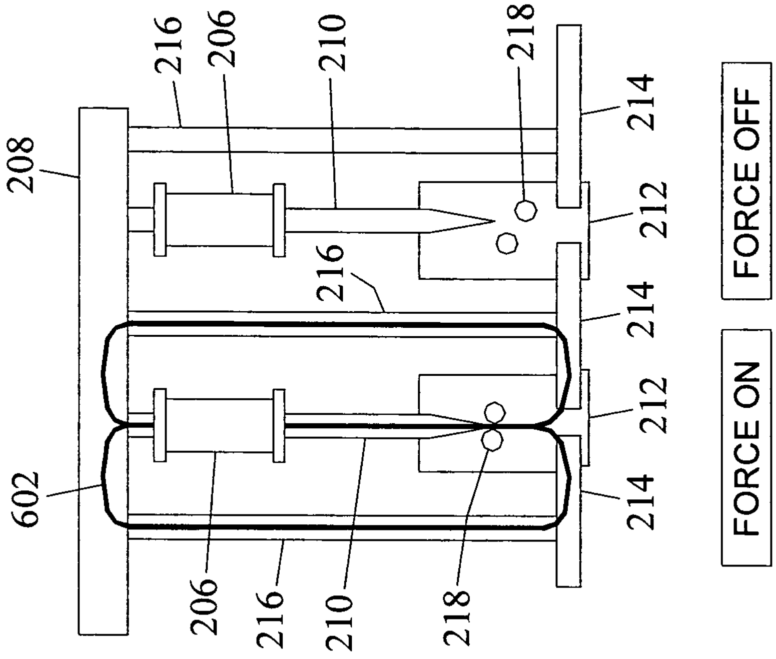
FIGS. 6A and 6B are diagrams of an exemplary high throughput magnetic force system that employs a sharp pole tip to penetrate a specimen well according to an embodiment of the subject matter described herein.
Figure 6A:
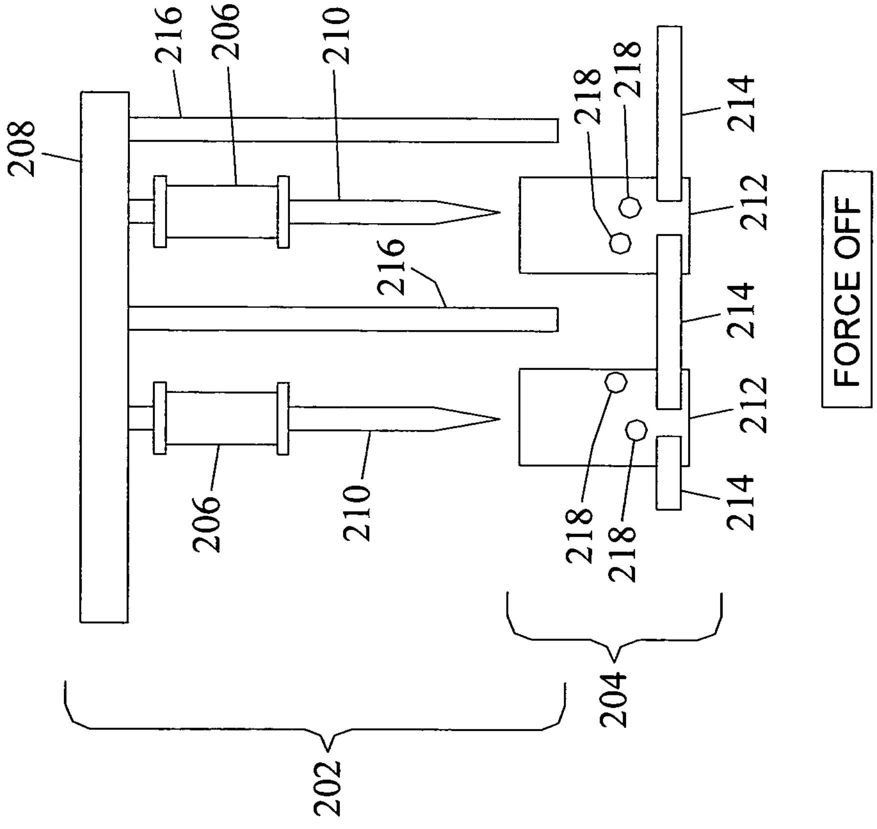

FIGS. 6A and 6B show a configuration whereby the final field geometry at the specimen is determined by the shape of the excitation pole that is directly engaged by the coil in exciter assembly 202. In this exemplary embodiment, as shown in FIG. 6A, magnetic excitation poles 210 include pointed ends and do not contact the field forming poles 214 that are part of multiforce plate 204. In one embodiment, there is a thin film plate that includes circular holes, with the downward pointing excitation pole tip centered within this clear hole. This configuration may be useful in instances where the force is to be applied upward. One application of this may be to generate upward forces to dislodge probes 218 from cell surfaces. By functionalizing the probes so that they attach to specific ligands that may be present on a cell surface, this configuration may be able to quantify ligand binding and cell adhesion in the multiwell format. Probes 218 once separated, may attach to the tip of excitation pole 210. This is shown in FIG. 6B where the flux 602 is returned through field forming poles 214, then into flux return posts 216 adjacent to specimen well 212. Flux 602 then continues into flux return plate 208. Notably, the force in well 212 would be up to the excitation pole tip and may be used to pull probes 218 off of cells. Probes 218 may then be extracted by lifting up the excitation pole (which still energized) and placing it into a separate multiwell plate. Excitation pole 210 may then be de-energized, thereby releasing probes 218 into a solution where the probes may be analyzed to measure a biochemical or protein that may have adhered to the probes 218. In another embodiment, the tip of excitation pole 210 may be flat to generate essentially even fields over a region of the specimen. This may be useful where the goal is to generate torques on magnetized probes 218 and for measuring cell binding and mechanical properties.

Figure 7:
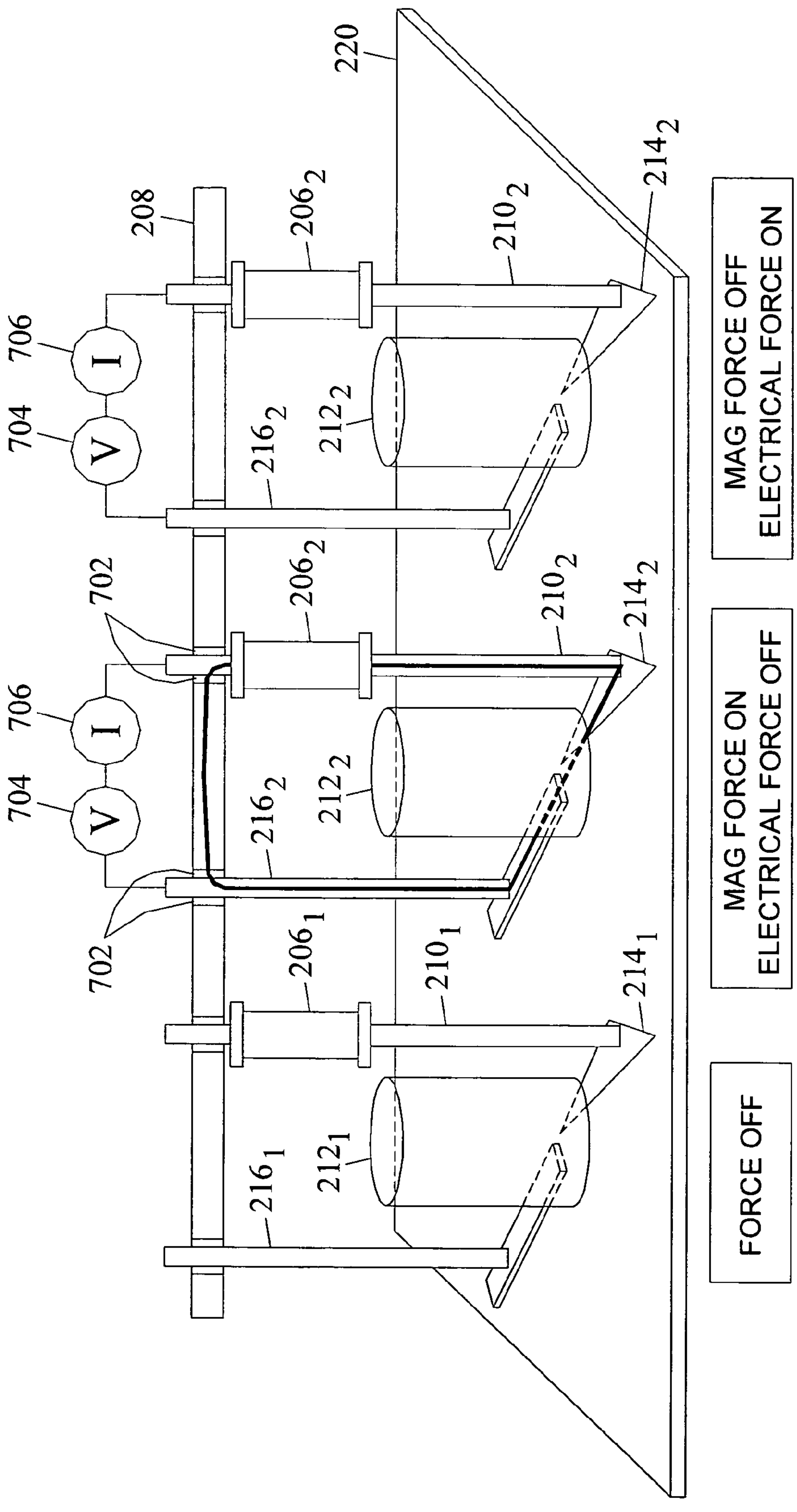
FIG. 7 is a diagram of an exemplary multiforce high throughput screening system according to an embodiment of the subject matter described herein.

In addition to, or in lieu of, magnetic fields, force may be applied by utilizing electric fields. These electric fields may be constant in time (e.g., direct current (DC) fields) or be applied at various frequencies. The electrical fields can apply forces to objects or molecules that are charged or polarizable. As such, these fields may be applied with the same effects and applications as denoted above for magnetic fields. In one embodiment, system 100 can also apply electric potential, fields, forces and currents to specimens in the multiwell plate. To apply an electric field, electrical contact is made between a given field forming pole and a corresponding excitation pole. In one embodiment, this may be accomplished by making use of the in-place magnetic system (described above) as shown in FIG. 6. The magnetic drive system, or exciter assembly 202, establishes contact through an excitation pole 210 (i.e., drive core) to one of field forming poles 214. An electrical connection is made by this excitation pole to the magnetic field forming pole because the excitation pole is being used as an electrical conductor. In one embodiment, field forming poles 214 are electrically isolated from each other. For example, this may be accomplished as shown in FIG. 7 by placing a small electrically insulating gap 702 in exciter assembly 202 where each excitation pole 210 connects. This small gap 702 may have minimal effect on the magnetics while serving to electrically isolate field forming poles 214. In one embodiment, a separate voltage supply 704 (or current supply 706) may be connected to each excitation pole 210, which changes the electric potential on each field forming pole 214, thereby providing a varying electric field in the specimen region. This electric field can be applied independent of the magnetic field, and both can exist simultaneously within the specimen region. FIG. 7 shows a design where electric forces and measurements may be applied simultaneously with the application of magnetic forces. In this case, the magnetic materials of the excitation poles that carry the magnetic flux can be electrically isolated from each other at the flux return plate 208 (due to insulated gaps 702) without significantly altering the magnetic flux, field, and magnetic forces generated at the specimen. Excitation poles 210 may then be additionally connected to an electric potential 704 or a current supply 706, which may be conveyed to the field forming poles 214 in the specimen. In this case, the same field forming poles that carry magnetic flux may also carry electric signals. This application of electric signals at the specimen may be used for any of a plurality of electrical phenomena. In one embodiment, the generated electric fields may be used to generate forces or torques on charged or polarizable materials (e.g., biological, molecular, or non-biological) within specimen well 212. The generated electric fields may be used to generate currents within the specimen well 212 or at field forming poles 214 to make electrochemical changes in the specimen or electrochemical measurements of the contents of the well.

Figure 8:
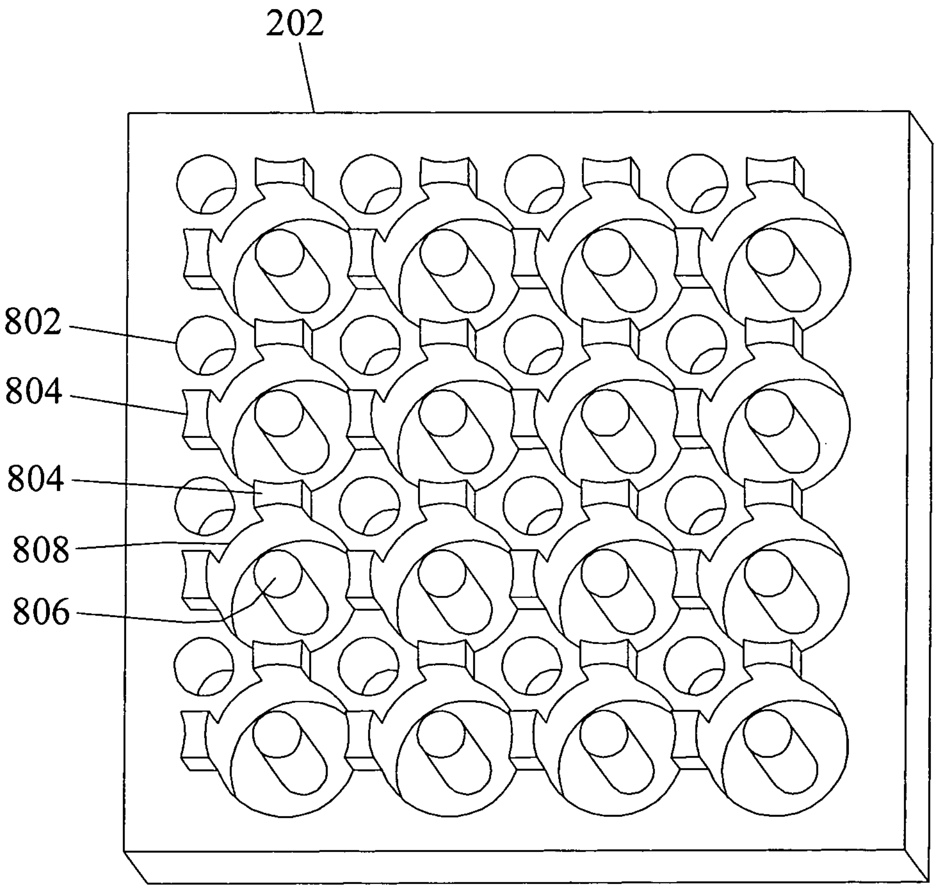
FIG. 8 is a diagram of a magnetic core of an exciter assembly suitable for use with embodiments of the subject matter described herein.

FIG. 8 illustrates an exemplary exciter assembly 202 that may be used by the present subject matter. Exciter assembly 202 includes coil posts 806, flux return posts 804, and illumination apertures 802. Although FIG. 8 only depicts a 4×4 array embodiment, a full scale exciter assembly may be manufactured to cover a conventional 384 well multiwell plate. The exciter assembly would then include 96 illumination apertures, which are open holes to allow for transmission microscopy. More specifically, an exciter assembly designed for a 384 multiwell plate uses three out of four wells for the magnetic system, leaving 96 wells active for specimens. That is, for every 4 holes (2×2 array) of the multiwell plate, two are used for flux return posts 804 (i.e., flux return posts 216), one is used for illumination aperture 802, and one is used for coil post 806 (i.e., excitation pole 210).

The cylindrical openings 808 containing the central coil posts 806 are used to hold the coils that generate flux (e.g., a wire may be wrapped around coil post 806 and contained within cylindrical opening 808). The flux passes through the central post 806 and is coupled into the field forming poles that are mounted to the pole plate on the bottom of a multiforce plate. The flux returns through flux return posts 804 that enter through the multiforce plate through two wells neighboring the specimen well. In one embodiment, exciter assembly 202 may be machined from soft iron for high permeability and saturation, and low hysteresis.

Figure 9A:
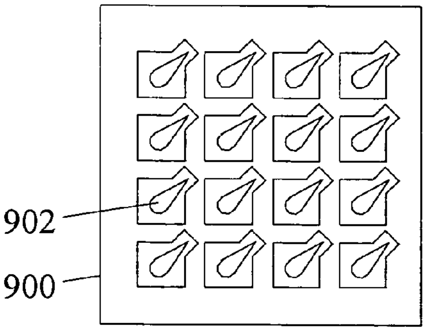
FIGS. 9A and 9B are arrays of field forming poles suitable for use with embodiments of the subject matter described herein.
Figure 9B:
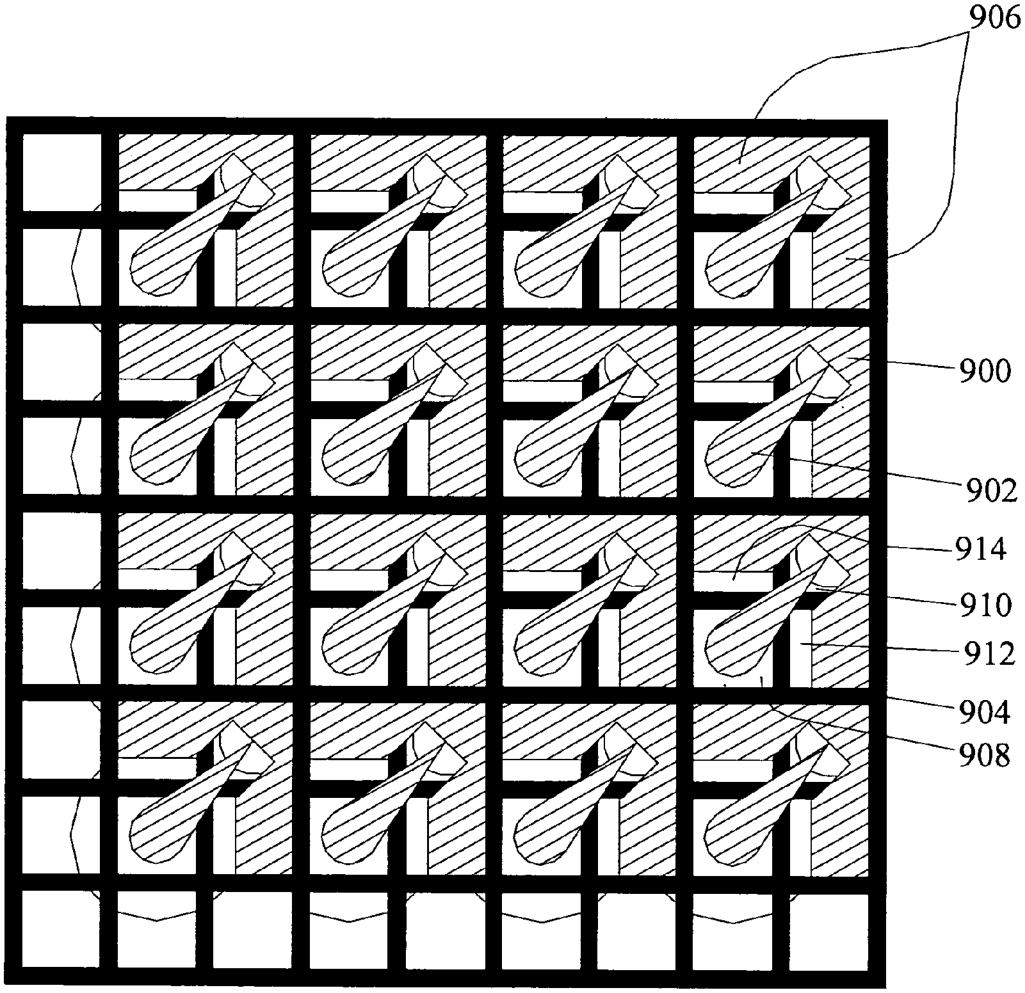

In one embodiment, "pole pattern laminates" are designed to form the bottom of the multiforce plate. Shown in FIGS. 9A and 9B is an exemplary 4×4 array of field forming poles 214 that may have been etched in a foil sheet (e.g., permalloy) using a combination of lithography and wet chemical etching. The field forming poles may be bonded to a cover glass sheet (i.e., to make a pole plate) that is suitable for high resolution microscopy. This bonded sheet may then be affixed to the underside of a bottomless multiwell plate, such as a conventional microtiter plate. Shown in FIG. 9A is a particular design of a pole plate 900. In one embodiment, pole plate 900 may include a sheet of magnetic permalloy foil etched to create "pole-flat" regions in which a sharp pole tip is located near a flat one to form a high gradient magnetic field. It can be seen in FIG. 9B that the rounded end of a "tear drop" piece 902 fills one of the wells. The flux from the "tip" of piece 902 re-enters the metal film in the opposite flat whose "wings" 906 cover the other two neighboring wells. A coil post 706, i.e., an excitation pole, is aligned to contact the rounded end of the teardrop shaped piece 902, while two flux return posts 704 in the other two neighboring wells are aligned to contact wings 906. The high gradient field location where the sharp tip opposes the flat one is arranged to be in the specimen well. When exciter assembly 202 is placed on top of the multiforce plate, illumination apertures 802 (as shown in FIG. 8) of exciter assembly 202 align with the specimen wells.

FIG. 9B illustrates that when pole plate 900 is bonded to the bottom of a multiwell plate to form a multiforce plate, it leaves every fourth well for specimens, with the rest of the wells used to accommodate excitation poles 706 and flux return posts 704. Notably, FIG. 9B depicts how the present subject matter appears from the viewpoint of pole plate 900 overlaid on top of a multiwell plate 904, which in turn is coupled to an exciter or coil assembly on the opposing side. As shown in FIG. 9B, the multiwell plate and pole plate combination may be "conceptually" divided in 2×2 well sections. Specifically, for each specimen well (e.g., well 910), one well (e.g., well 908) is used to carry flux from an excitation pole 806, while the two neighboring wells (e.g., wells 912 and 914) are used to return flux to the magnetic flux return plate. The fact that the return paths from the wells are connected together does not matter within the scope of magnetic circuits, as this is identical to having a ground plane in an electrical circuit.

Multiforce plate 204 may be designed to have field forming poles 214 to be in contact with or proximity to all of the wells 212 simultaneously. In one embodiment, field forming poles 214 may be separate from exciter assembly 202 for convenient changing of the field configuration at the specimen array. In addition, multiforce plate 204 may be either incorporated into the specimen array (i.e., multiwell plate) or be separate. In one embodiment, multiforce plate 204 is incorporated into the multiwell plate so that each well 212 has a number of field forming poles 214 projecting into the specimen well to interact with the specimen.

Many other field forming pole configurations may be envisioned in the specimen well. One possible configuration may include a "pole-pole" geometry which entails two identical poles that may have large forces near each of them, but due to symmetry, have low force in the center. Similarly, a "comb" geometry with multiple sharp tips, each providing force near its region, has been considered. The "comb" configuration may provide larger effective "force-area" product allowing for the application of significant force to more probes within the specimen well.

Figure 10A:
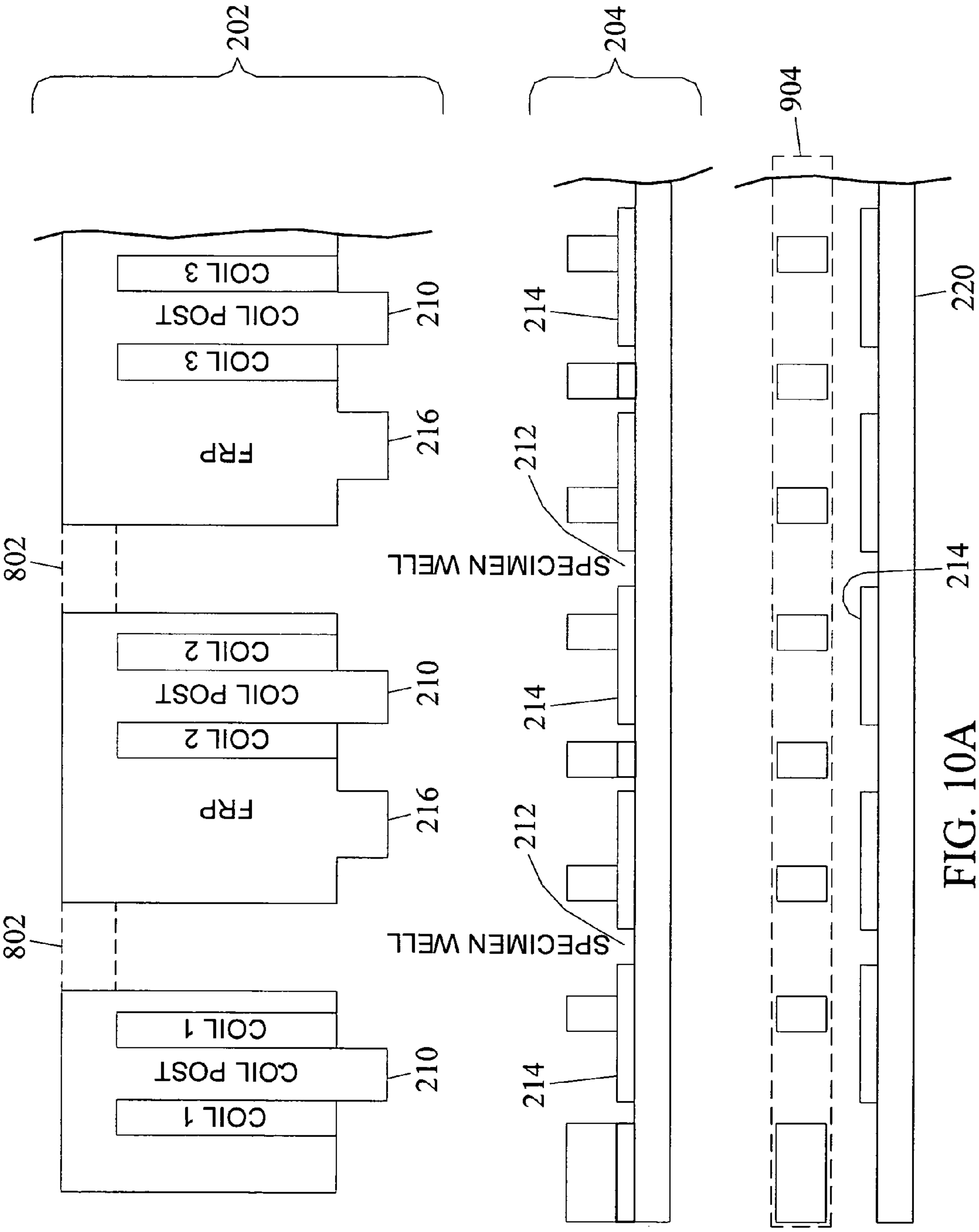
FIGS. 10A and 10B are diagrams illustrating operation of a multiforce high-throughput screening system according to an embodiment of the subject matter described herein.
Figure 10B:
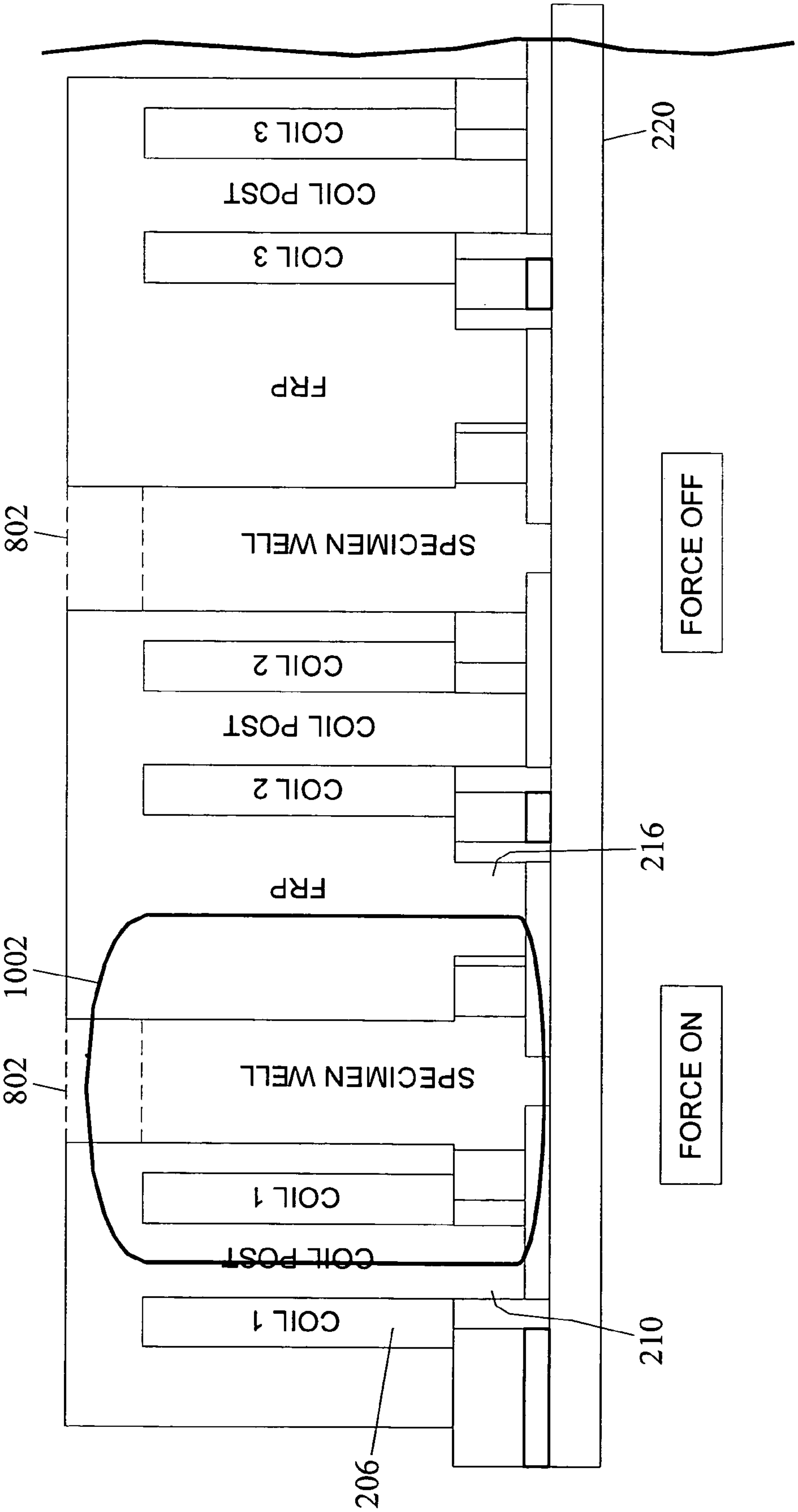

FIGS. 10A and 10B show the operation of the designed system where a schematic cross section of exciter assembly 202 is located over multiforce plate 204. Specifically, FIG. 10A depicts the different sections of a pole plate comprising a bonded field forming pole/cover glass sheet combination. Cover glass plate 220 (which includes bonded field forming poles 214) is further bonded to a bottomless well plate 904 to create an assembled multiforce plate, 204. Exciter assembly 202 is shown above plate 204. It should be noted that FIGS. 10A and 10B are illustrated in schematic form whose geometry is representative of the relationship between coils, specimen wells, and flux return path. The actual design may not have a "cut" cross section as depicted in FIGS. 10A and 10B.

FIG. 10B illustrates the coupling of exciter assembly 202 and assembled multiforce plate 204. The path of the flux 1002 is shown as a solid line that closes on itself linking a coil 206 in exciter assembly 202. In this configuration, each coil is assigned to one specimen well. When the coil 206 receives current, flux 1002 is generated in excitation pole 210 and coupled to a corresponding field forming pole, thereby applying a force to a magnetic material, such as a probe, in the corresponding specimen well. Notably, the flux path of flux 1002 is localized to a single specimen well. In one embodiment, the present subject matter may be used to apply an electric field to electrically charged probes or molecules for an electrophoresis effect. For example, a first probe with a negative charge and a second probe with a positive charge may be separated by applying an electric field to the specimen well where the probes reside. This may be accomplished by applying an electrical potential to the excitation pole (instead of applying a magnetic potential via the coil winding) and coupling it to the field forming pole to form an electric field in the specimen well which in turn causes probes (or molecules) with different charges to move in different directions. Thus, electrophoresis may be used to separate probes using electric field.

Similarly, the present subject matter may also be used to form an electrical field gradient in the specimen well to apply forces to electrically polarized particles. In one embodiment, this may be accomplished by inducing a dipole in a molecule or probe by applying a voltage to the field forming pole. This polarizes the molecule (e.g., causes positive particles in the molecule or probe to go to one side and the negative particles to go to the opposite side) in such a way that the gradient of the electrical field pulls the molecule in a certain direction. Notably, different materials are affected by this dielectophoresis effect based on the polarizability of the material.

In one embodiment, the present subject matter may be used to apply an alternating current (AC) field to the specimen well. This frequency dependent embodiment may be achieved by applying an AC voltage to the excitation pole. This action provides a dielectophoresis effect that is unique to each material type. Namely, different materials have different frequency dependencies to dielectric functions. For example, small molecules of a given material may be caused to rotate in response to a rapidly shifting field at a given frequency, whereas large molecules of another material may not respond at this frequency. Thus, the dielectrophoresis effect may be used in this scenario to separate molecules of contrasting size by modifying the frequency of the AC field.

In one embodiment, the present subject matter may be used to conduct electrochemistry tests on specimens. For example, an excitation pole may be provisioned with one or more electrodes that that are used to apply an electric field to a specimen in a specimen well. The electrodes may then be used to monitor current in the specimen. By monitoring the current, changes in the chemistry of the specimen may be detected. Notably, various properties of the specimen may be determined by monitoring the current, such as measuring the conductivity of the specimen.

Figure 11:
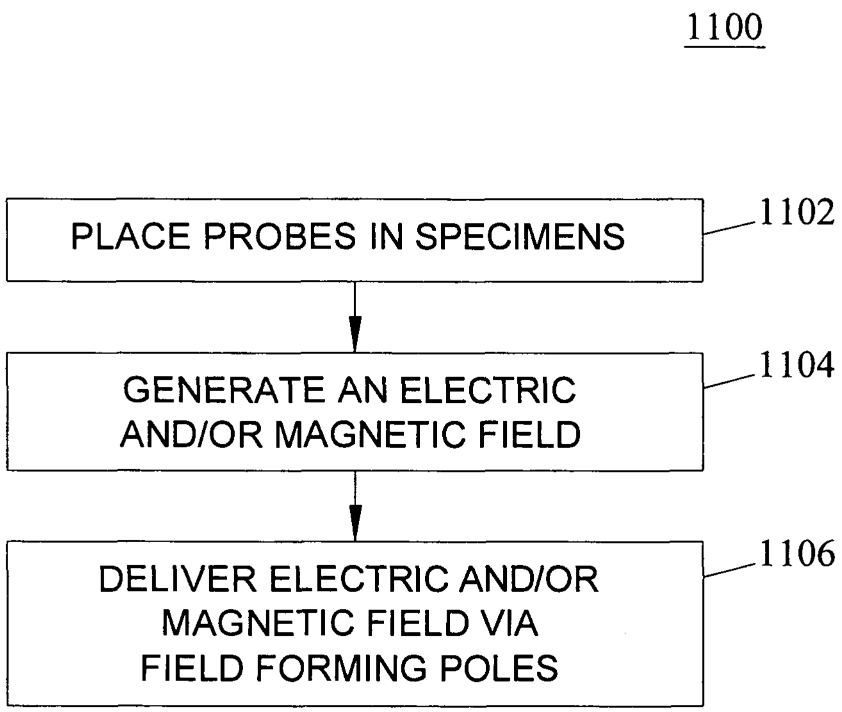
FIG. 11 is a flow chart of an exemplary method for performing high throughput screening to test mechanical properties of a specimen according to an embodiment of the subject matter described herein.

FIG. 11 is a flow chart of an exemplary method 1100 for providing high throughput screening for applying force to a plurality of mechanically unattached probes according to an embodiment of the subject matter described herein. Referring to FIG. 2, in block 1102, the plurality of mechanically unattached probes are placed in a plurality of specimens. In one embodiment, probes (such as beads or rods) may be placed in wells of a multiforce plate. The wells themselves may contain a plurality of biological specimens (e.g., one or more cells, tissues, etc.) or chemical specimens (e.g., one or more molecules, compounds, etc.).

In block 1104, at least one field is generated. In one embodiment, an electrical and/or magnetic field is created by coupling excitation poles that are disposed on an exciter assembly with corresponding field forming poles positioned on a multiforce plate. The field forming poles may be positioned on the multiforce plate at a location corresponding to the wells in a multiwell plate.

In block 1106, the field forming poles may be used to form fields. In one embodiment, the field forming poles are used to form at least one of an electric or magnetic field in the vicinity of the field forming poles. The field forming poles apply force via the electric or magnetic field and/or their gradients to the probes located in the wells in order to move the probes and test the mechanical properties of the specimens in the wells.

Figure 12:
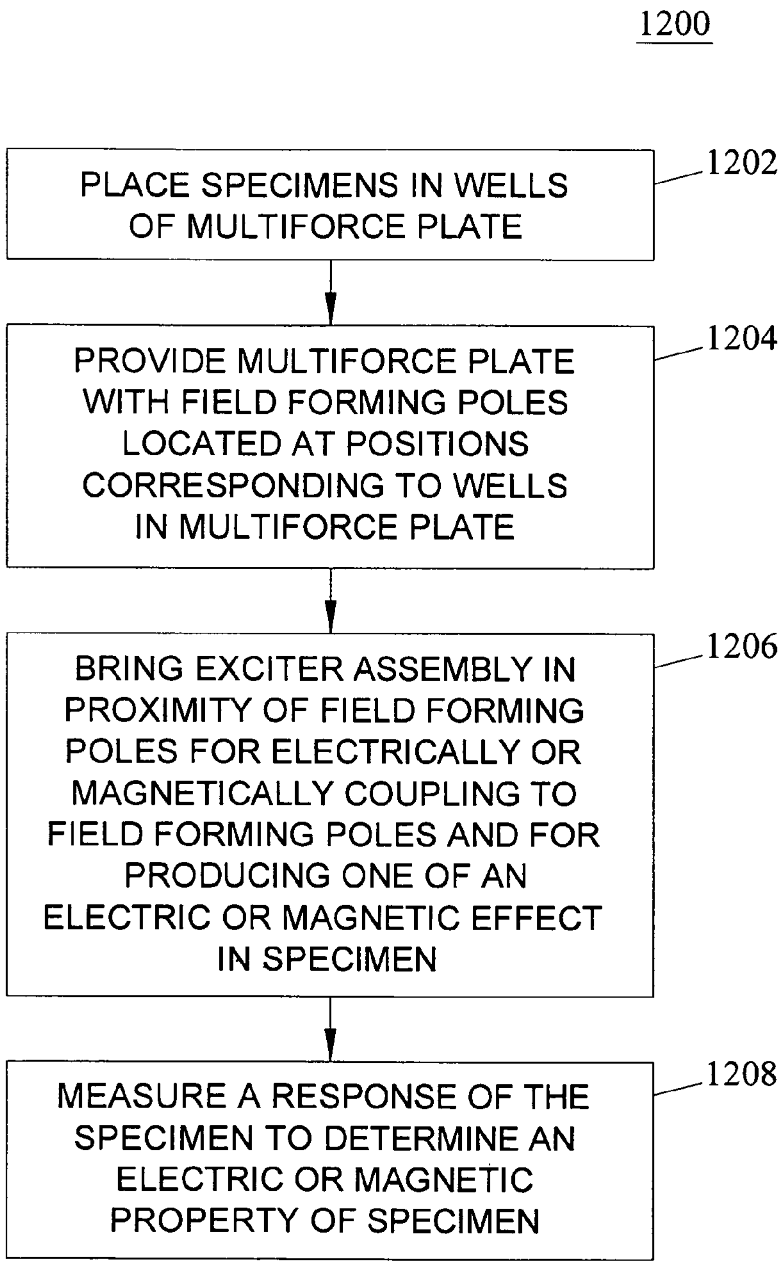
FIG. 12 is a flow chart illustrating an exemplary process for multiforce high throughput screening to test electric or magnetic properties of a specimen according to an embodiment of the subject matter described herein.

FIG. 12 is a flow chart illustrating an exemplary process 1200 for high-throughput screening to determine at least one of electric and magnetic properties of specimens according to an embodiment of the subject matter described herein. Referring to FIG. 12, in block 1202, a plurality of specimens is placed in wells of a multiforce plate. In block 1204, the multiforce plate is provided with field forming poles at positions corresponding to the specimen wells.

In block 1206, an exciter assembly is brought into the proximity of the field forming poles for electrically or magnetically coupling to the field forming poles and for producing one of an electric or magnetic effect in the specimens. As stated above, the electrical magnetic effect may be an electrophoretic effect, a dielectrophoretic effect, or an electrochemical effect. In block 1208, the effect is measured to determine an electric or magnetic property of the specimen. For example, if the effect is an electrophoretic or dielectrophoretic effect, separation of specimen molecules based on electric charge or polarizability may be measured. If the effect is an electrochemical effect, a voltage may be applied and a corresponding current may be measured to determine conductivity of the specimen. If the effect is a frequency dependent effect, an electric or magnetic field of a particular frequency may be applied and the corresponding frequency responses of the specimens may be measured.

It will be understood that various details, of the presently disclosed subject matter may be changed without departing from the scope of the presently disclosed subject matter. Furthermore, the foregoing description is for the purpose of illustration only, and not for the purpose of limitation.

What is claimed is:

1. A high throughput screening system for applying force to a plurality of mechanically unattached probes located in specimens contained in wells of a multiwell plate, the system comprising:

- a multiforce plate having disposed thereon a plurality of field forming poles, each field forming pole being located on the multiforce plate at a location corresponding to a well in a multiwell plate; and
- an exciter assembly having excitation poles disposed thereon at locations corresponding to the field forming poles, for electrically or magnetically coupling to the field forming poles, and for delivering via the field forming poles at least one of an electric and a magnetic field in the vicinity of the field forming poles, wherein the coupled field forming poles apply force via the at least one field to mechanically unattached probes located in the wells of the multiwell plate to move the probes and test mechanical properties of specimens in the wells, wherein the exciter assembly and the field forming poles are configured for individual control of force applied to each well of the multiwell plate by providing a flux return path for each well in the multiwell plate that is separate from flux return paths of other wells in the multiwell plate.

2. The system of claim 1 wherein each field forming pole comprises an elongate member having a first end that contacts the exciter assembly and a second end that terminates in at least one pole tip.

3. The system of claim 2 wherein each field forming pole has a teardrop-like shape.

4. The system of claim 2 wherein each field forming pole has a single pole tip.

5. The system of claim 2 wherein each field forming pole has a plurality of pole tips for increasing the usable area of each specimen well for force delivery.

6. The system of claim 1 wherein the multiforce plate includes a pole plate that is mounted to an underside of the multiwell plate and wherein the exciter assembly is adapted to mate with the multiforce plate from above such that the excitation poles extend between the specimen wells and contact the field forming poles.

7. The system of claim 1 wherein the mechanical property comprises at least one of a viscoelastic property, a rheological property, and a response to applied stress.

8. The system of claim 1 wherein the exciter assembly forms an aperture in the vicinity of each well to allow imaging of the specimen and wherein the system further comprises an optical imaging system for imagining the specimens via the apertures.

9. The system of claim 2 wherein the optical imagining system includes a lens located in each aperture to focus a light beam on the specimen.

10. The system of claim 2 wherein the lens comprises a gradient index of refraction lens.

11. The system of claim 2 wherein the optical imaging system includes at least one illumination source and a collector located on opposing sides of the apertures for imaging the specimens.

12. The system of claim 2 comprising an image-based tracking system associated with the optical imaging system for tracking motion of each probe based on images recorded by the optical imaging system.

13. The system of claim 2 wherein the optical imaging system is used to detect biochemical activities in the specimen by detecting fluorescence signals.

14. The system of claim 2 wherein the optical imaging system includes a single specimen imaging system with a robotic stage that brings each well of the multiwell plate over a microscope objective.

15. The system of claim 2 wherein the optical imaging system includes an array of microscopes that is used to image a plurality of wells simultaneously.

16. The system of claim 1 wherein multiwell plate comprises a microtiter plate.

17. The system of claim 1 wherein the field forming pole comprises a thin film field forming pole.

18. The system of claim 1 wherein the field forming pole comprises a thin foil field forming pole.

19. The system of claim 1 wherein the field forming poles simultaneously apply force to plural wells in the multiforce plate.

20. The system of claim 1 wherein the at least one field is a magnetic field.

21. The system of claim 1 wherein the at least one field is an electric field.

22. A high throughput screening system for applying force to a plurality of specimens contained in wells of a multiwell plate, the system comprising:

- a multiforce plate having disposed thereon a plurality of field forming poles, each field forming pole being located on the multiforce plate at a location corresponding to a well in a multiwell plate; and
- an exciter assembly having excitation poles disposed thereon at locations corresponding to the field forming poles, for electrically or magnetically coupling to the field forming poles, and for producing at least one of an electric and a magnetic effect, wherein the coupled field forming poles apply the effect to specimens located in the wells of the multiwell plate to test electric or magnetic properties of the specimens in the wells, wherein the exciter assembly and the field forming poles are configured for individual control of force applied to each well of the multiwell plate by providing a flux return path for each well in the multiwell plate that is separate from flux return paths of other wells in the multiwell plate.

23. The system of claim 22 wherein each field forming pole comprises an elongate member having a first end that contacts the exciter assembly and a second end that terminates in at least one pole tip.

24. The system of claim 22 wherein each field forming pole has a teardrop-like shape.

25. The system of claim 22 wherein each field forming pole has a single pole tip.

26. The system of claim 22 wherein each field forming pole has a plurality of pole tips for increasing the usable area of each specimen well for force delivery.

27. The system of claim 22 wherein the multiforce plate includes a pole plate that is mounted to an underside of the multiforce plate and wherein the exciter assembly is adapted to mate with the multiforce plate from above such that the excitation poles extend between the specimen wells and contact the field forming poles.

28. The system of claim 22 wherein the mechanical property comprises at least one of a viscoelastic property, a rheological property, and a response to applied stress.

29. The system of claim 22 wherein the effect comprises a dielectrophoretic effect.

30. The system of claim 22 wherein the effect comprises an electrophoretic effect.

31. The system of claim 22 wherein the effect comprises a frequency dependent effect.

32. The system of claim 22 wherein the effect comprises a conductive effect.

33. A method for providing high throughput screening for applying force to a plurality of mechanically unattached probes located in specimens contained in wells of a multiwell plate, the method comprising:

placing a plurality of mechanically unattached probes in specimens contained in wells of a multiwell plate;

generating an electrical or magnetic field by coupling excitation poles disposed on an exciter assembly with corresponding field forming poles positioned on a multiforce plate, wherein the field forming poles are positioned on the multiforce plate at locations corresponding to the wells in the multiwell plate; and delivering via the field forming poles at least one of an electric and a magnetic field in the vicinity of the field forming poles, wherein the field forming poles apply force via the at least one field to the plurality of mechanically unattached probes located in the wells to move the probes and test mechanical properties of the specimens in the wells, wherein the exciter assembly and the field forming poles are configured for individual control of force applied to each well of the multiwell plate by providing a flux return path for each well in the multiwell plate that is separate from flux return paths of other wells in the multiwell plate.

34. A method for high-throughput screening of a plurality of specimens to determine electric or magnetic properties of the specimens, the method comprising:

placing the plurality of specimens in wells of a multiwell plate;

providing a multiforce plate with field forming poles located at positions corresponding to wells in the multiforce plate;

bringing an exciter assembly in proximity to the field forming poles for electrically or magnetically coupling to the field forming poles and for producing one of an electric or magnetic effect in the specimen; and measuring a response of the specimens to determine an electric or magnetic property of the specimens, wherein the exciter assembly and the field forming poles are configured for individual control of force applied to each well of the multiwell plate by providing a flux return path for each well in the multiwell plate that is separate from flux return paths of other wells in the multiwell plate.

35. The method of claim 34 wherein the multiforce plate comprises a thin film plate coupled to an underside of the multiforce plate and wherein the exciter assembly comprises a plurality of posts adapted to fit between the wells in the multiforce plate and to contact the field forming poles.

36. The method of claim 34 wherein the effect comprises one of a dielectrophoretic effect, an electrophoretic effect, a magnetic effect, and a frequency dependence of the specimens.

* * * * *